United States Patent [19]

Kashio

[11] 4,332,181

[45] Jun. 1, 1982

[54] ELECTRONIC MUSICAL INSTRUMENT WITH MEANS FOR SELECTING TONE CLOCK NUMBERS

[75] Inventor: Toshio Kashio, Tokyo, Japan

[73] Assignee: Casio Computer, Co., Ltd., Tokyo, Japan

[21] Appl. No.: 103,037

[22] Filed: Dec. 13, 1979

Related U.S. Application Data

[63] Continuation of Ser. No. 863,409, Dec. 22, 1977, abandoned.

[30] Foreign Application Priority Data

Dec. 24, 1976 [JP] Japan ............................ 51-155121

[51] Int. Cl.³ ............................................. G10H 5/07
[52] U.S. Cl. ............................... 84/1.01; 84/DIG. 11
[58] Field of Search ............... 84/1.01, 1.03, DIG. 11; 340/365 R, 365 S

[56] References Cited

U.S. PATENT DOCUMENTS

| | | | |
|---|---|---|---|
| 3,735,012 | 5/1973 | Hirano | 84/1.01 |
| 3,743,756 | 7/1973 | Franssen et al. | 84/1.01 |
| 3,795,754 | 3/1974 | Mochida | 84/1.01 |
| 3,808,345 | 4/1974 | Franssen | 84/1.01 |
| 3,808,347 | 4/1974 | Gehrig | 84/1.01 |
| 3,809,787 | 5/1974 | Mochida | 84/1.01 |
| 3,828,643 | 8/1974 | Morez | 84/1.01 X |
| 3,844,379 | 10/1974 | Tomisawa et al. | 84/1.01 |
| 3,949,365 | 4/1976 | Kashio | 340/365 S X |
| 3,979,989 | 9/1976 | Tomisawa et al. | 84/1.01 |

*Primary Examiner*—Stanley J. Witkowski
*Attorney, Agent, or Firm*—Frishauf, Holtz, Goodman and Woodward

[57] ABSTRACT

A circuit for obtaining a musical-scale frequency in an electronic musical instrument comprises a multi-stage binary counter for counting reference clock signals to obtain a respective musical-scale frequency based on the tempered scale, circuit means for taking a plurality of specific different count values from the binary counter, and selection circuit means for selecting the output of the circuit means according to each musical-scale.

5 Claims, 4 Drawing Figures

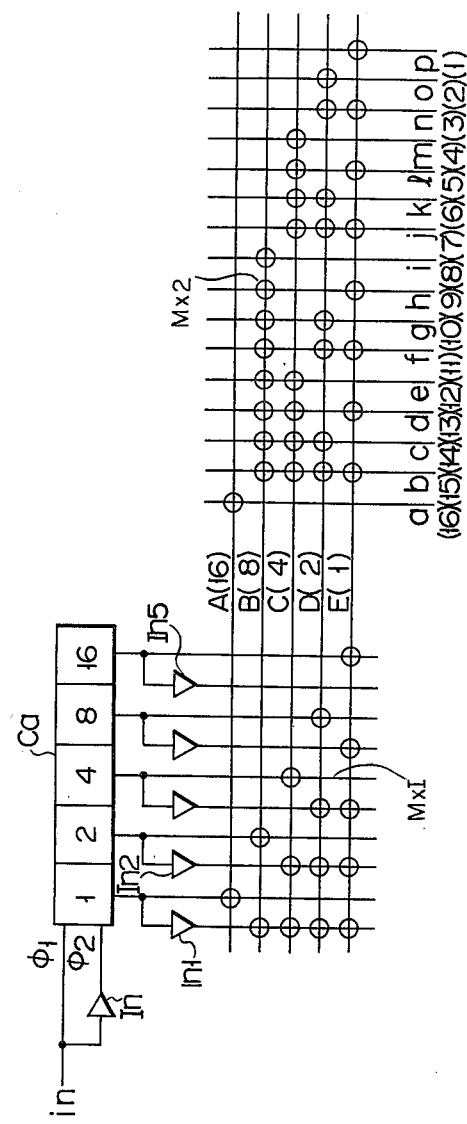

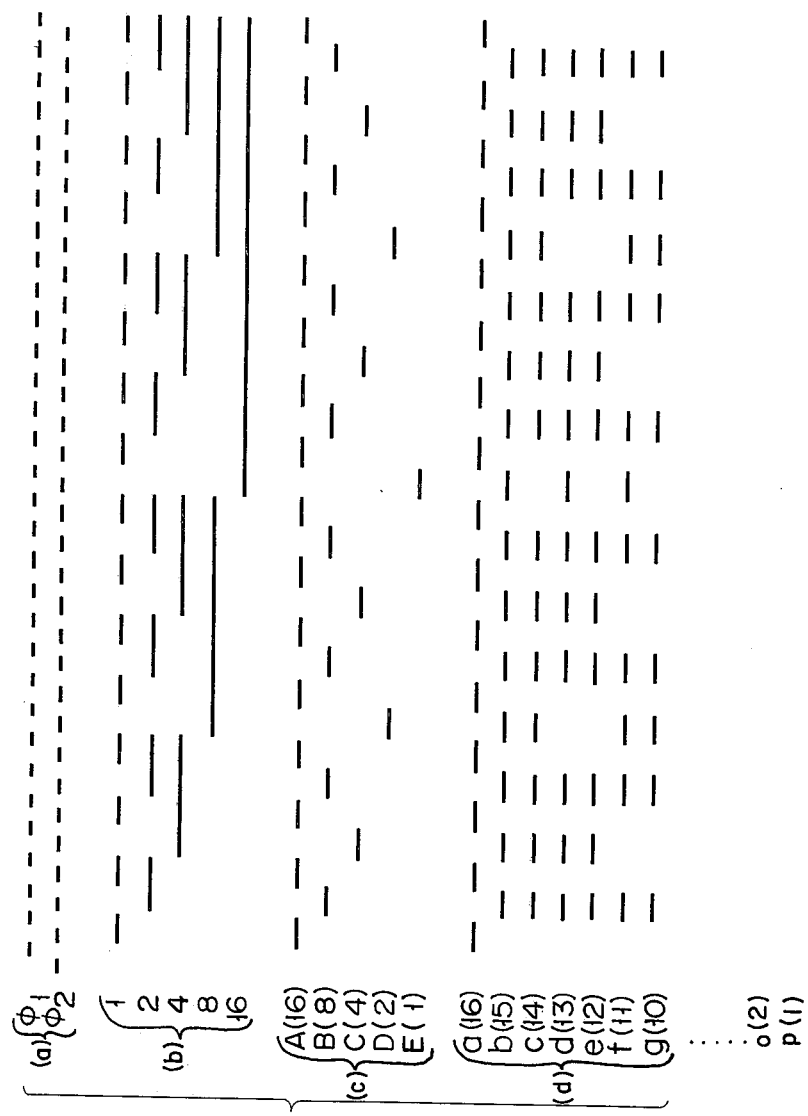

ELECTRONIC MUSICAL INSTRUMENT WITH MEANS FOR SELECTING TONE CLOCK NUMBERS

This is a continuation, of application Ser. No. 863,409 filed Dec. 22, 1977, and now abandoned.

BACKGROUND OF THE INVENTION

The present invention relates to an electronic musical instrument having a circuit for obtaining a musical-scale clock frequency.

In an electronic musical instrument, in general, an analogue waveform is discretely divided into a number of steps with respect to time. Magnitudes of the steps are converted into corresponding digital values. The digital values converted are stored in a tone waveform signal memory at the addresses corresponding to the steps. For reproduction of the original analogue wave form, the digital values stored in the memory are read out through a successive address shift. Then, the read-out digital values are subjected to digital to analogue conversion. In this case, the cycle of the analogue waveform reproduced depends on the address shift speed. Accordingly, the cycle of the analogue wave form reproduced may be freely controlled by changing the frequency of the clock signal used for address shift.

It is assumed now that the waveform stored in the memory is a musical sound waveform and the reading operation of the memory is performed through repetitive address shifting by a clock signal. In this case, the frequency of the reproduced musical sound wave form is determined by the clock frequency, i.e. the number of clock signals per unit time. Accordingly, if the reproduced sound waveform is converted into sound by a speaker, the pitch of the reproduced musical sound is variable by changing the number of clocks per unit time.

SUMMARY OF THE INVENTION

A primary object of the invention is to provide a circuit for obtaining a frequency corresponding to the desired tone of an electronic musical instrument.

According to this invention, an apparatus for use in an electronic musical instrument for selecting one of a plurality of tone clock numbers, comprises means for generating reference clock signals; binary counting means including a plurality of stages for binary-counting the reference clock signals from the clock signal generating means; a plurality of output lines for outputting a logical product of a pair of binary signals, one from one of the stages of the binary counting means and the other from another lower stage thereof; tone clock number selection means for selecting at least one of the output lines to thereby obtain an output clock number corresponding to one of twelve tone clock frequency signals representing twelve tones, any two adjacent tone clock frequency signals having a frequency difference of substantially $\sqrt[12]{2}$.

According to this invention a musical-scale clock frequency can be obtained with a simple digital circuit arrangement. Further, the pulse number of musical-scale clocks produced per unit time is averagely balanced according to the count contents of one binary counter, making the tone stable. The circuit arrangement is simplified and suitable for LSI implementation, resulting in a low-cost apparatus.

BRIEF DESCRIPTION OF THE DRAWINGS

FIG. 1 is a circuit diagram of a main section used in an apparatus for selecting a tone corresponding to the number of clocks;

FIG. 2 is a set of diagrams for illustrating the operation of the circuit of FIG. 1.

DETAILED DESCRIPTION

Figure 3A:
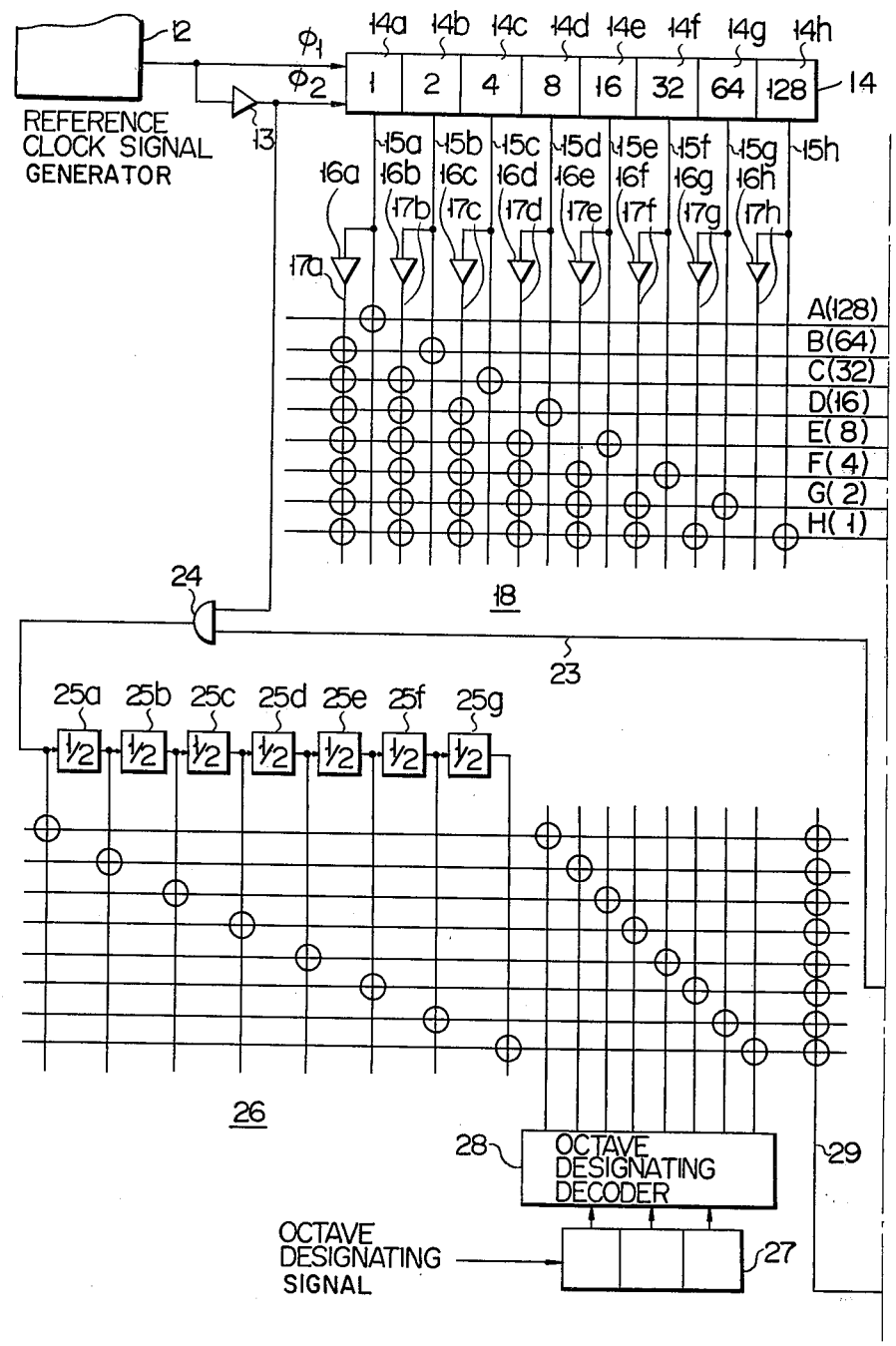
FIGS. 3A and 3B are schematic diagrams of an apparatus for use in an electronic musical instrument employing the principle of the present invention.

Referring now to the drawings, and particularly to FIG. 1, there is shown a basic construction for generating a clock signal with a suitable number of clocks per unit time. A reference clock signal with 32 clocks per unit time, for example, is coupled with an input terminal in. The inputted clock signal is coupled with a counter circuit Ca including binary counters of five stages. An inverter In is coupled between the input terminal In and the input of the counter circuit Ca to form a clock pulse $\phi_2$. Two phase clock pulses $\phi_1$ which is directly fed from the input in and $\phi_2$ (FIG. 2a) are used to drive the counter circuit Ca. The counter circuit Ca is a binary counter generating a count signal of 5 bits. The respective bits outputted from the corresponding stages of the binary counter Ca are weighted "1", "2", "4", "8" and "16", as shown. Output signals of the respective stages are directly coupled with one group of column lines of a matrix circuit M×I and are coupled with another group of column lines of the same through inverters In 1 to In 5. The matrix circuit M×I includes five row lines A to E. Logical products of the output signals derived from the respective stages of the counter circuit Ca and the inverted output signals from the lower stages are taken out through the row lines A to E. With such a construction, as seen from FIG. 2, upon receipt of clock pulses $\phi_1$ and $\phi_2$, the counter circuit Ca produces at the respective stages "1", "2", "4", "8" and "16" logical "1" signals (FIG. 2b) and the row lines A to E provide 16, 8, 4, 2 and 1 pulses per unit time (FIG. 2c). These pulses from the row lines A to E are combined in another matrix circuit M×2 to produce logical sum outputs so that output lines a to p to provide 16 to 1 clock pulses per unit time (FIG. 2d). In this way, the clock number within a unit time may be properly selected with uniform intervals.

Figure 3B:
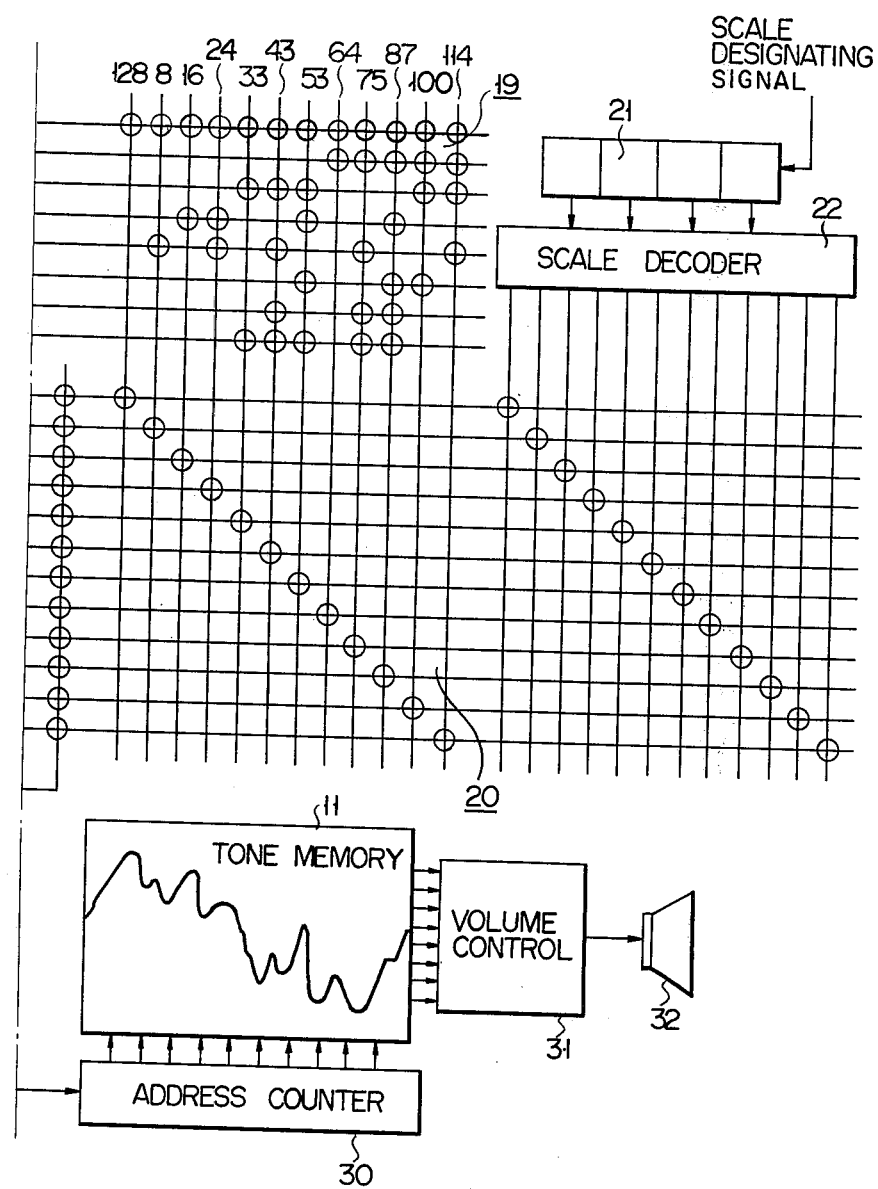

Referring now to FIGS. 3A and 3B, there is shown an example where the above mentioned clock number selecting means is applied to an electronic musical instrument. In this example, electronic musical sounds are read out from a tone memory 11 for sound production. A reference clock signal is generated from a reference clock signal oscillator 12. The reference clock signal inputted by reference clock signal oscillator 12 has 256 clocks per unit time. The clock signal $\phi_1$ and a clock signal $\phi_2$ which is formed by inverting clock signal $\phi_1$ by an inverter 13, are applied as two phase clock pulses to the counter circuit 14 for driving it. The counter circuit 14 is comprised of binary counters 14a to 14h, i.e. 8 stages. The respective stages 14a to 14h provide count signals weighted by numerals 1, 2, 4, 8, 16, 32, 64 and 128. That is, the count circuit 14 is an 8-bit binary counter. Output lines 15a to 15h coupled with the corresponding stages 14a to 14h produce output signals which are inverted every 1, ... and 128 clocks $\phi_1$, in the state "1" or "0". The output lines 15a to 15h are coupled with inverters 16a to 16h which invert the signals on the lines 15a to 15h, respectively, which are in turn applied to output lines 17a to 17h.

As described above, the counter circuit 14 includes a first group of output lines 15a to 15h for taking out binary output signals from the corresponding stages 14a to 14h and a second group of output lines for taking out other binary output signals. These two groups of output lines are coupled with a first matrix circuit 18. 8 row lines A to H are included in the matrix 18 and produce logical products of the output signals "1" from the respective stages 14a to 14h and of the other output signals "1" which are fed from the lower stages, through inverters.

An output signal derived from the row line A is an output pulse signal in which each pulse is given every two clock pulses $\phi_1$. The row line B produces a pulse signal of which each pulse is produced every 4 clock pulses. A pulse signal derived from the row line H includes pulses each produced every 128 clock pulses. The pulses derived from these row lines each have a time duration equal to that of each clock pulse. In other words, the row lines A to H deliver 128, 64, 32, 16, 8, 4, 2 and 1 output pulses per unit time, respectively.

The output pulses from the row lines A to H are applied to second matrix circuit 19 where these pulses are selectively and logically summed to produce an arbitrary number of pulses per unit time through the column lines. In this example for producing musical sound, 12 scales are arranged corresponding to 12 column lines of the matrix 19. With 128 for the reference clock frequency, the frequencies corresponding to the respective scales are successively assigned to the column lines, respectively.

In the equal temperament of 12 degrees, the frequency difference between adjacent scales is $\sqrt[12]{2}$. More specifically, if the frequency on a scale is f, the frequency of the succeding scale is $f + \sqrt[12]{2} \times f$, i.e. $f(1 + \sqrt[12]{2})$. Accordingly, if the number of clocks per unit time to set up the frequency of a scale C is 128, the relative clock numbers per unit time of other scales C# to B are tabulated in Table 1.

TABLE 1

| Scale | Clock Number | Clock Number Difference |
|---|---|---|
| C | 128 | |
| | | >8 |
| C♯ | 136 | |
| | | >8 |
| D | 144 | |
| | | >8 |
| D♯ | 152 | |
| | | >9 |
| E | 161 | |
| | | >10 |
| F | 171 | |
| | | >10 |
| F♯ | 181 | |
| | | >11 |
| G | 192 | |
| | | >11 |
| G♯ | 203 | |
| | | >12 |
| A | 215 | |
| | | >13 |
| A♯ | 228 | |
| | | >14 |
| B | 242 | |

Accordingly, the second matrix 19 is so designed that, in addition to the clock number "128" for a reference scale, it produces additive numbers "8", "16", "24", "33", "43", "53", "64", "75", "87", "100" and "114" for further higher 11 scales. 12 column lines of the matrix 19 deliver pulse signals of which the pulse numbers per unit time have been set up to a third matrix circuit 20.

Key depression on a keyboard (not shown) produces a scale specifying key input signal. The key input signal consisting of 4 bits, for example, is loaded into a register 21. The scale information in the register 21 is inputted into a scale decoder 22 where it is decoded to produce an output signal on one of 12 lines corresponding to the respective scales. The scale specifying signal from the scale decoder 22 is coupled with the third matrix 20 which in turn produces a clock number output signal per unit time corresponding to the scale key-inputted, through an output line 23.

For setting up the scales C, C♯, D ... A, B, when the keyed input scale is C, 128 pulses per unit are delivered to the output line 23, when it is C, 136 pulses are applied to the output line 23, and 242 pulses are delivered thereto for the keyed input B.

The output signal on the output line 23 is applied to an AND circuit 24 which is enabled by an output signal from the inverter 13. The AND circuit 24 produces a clock pulse output of which the clock number per unit time is set up corresponding to the keyed input scale. The output signal delivered from the AND circuit 24 is applied to ½ frequency dividing circuits 25a to 25g where it is successively frequency-divided into ½ in frequency. The frequency-divided signal is applied to a fourth matrix 24. In other words, the output signal from the AND circuit 24 corresponding to the scale is successively frequency-divided by ½ to produce clock signals with different octaves and of which the clock numbers are set up per unit time.

The keyboard specifies the scale as mentioned above and also specifies the octave through actuation of octave specifying keys. The octave specifying or designating signal is loaded into the register 27 which in turn is connected with an octave specifying decoder 28 where the octaves specifying key input signal is decoded. The output signal of the decoder 28 is coupled with the fourth matrix circuit 26 from which an output signal with a clock number per unit time corresponding to the specified scale of the octave specified is derived through an output line 29. The output signal of the matrix is then applied to an address shift instruction to the address counter 30. The level information digitally stored in the music sound waveform memory 11 are successively read out responsive to the rate of the clock signal. The read out information is applied to a volume control circuit 31 where it is converted into an analogue signal for driving the speaker 32.

With the thus constructed apparatus, the clock number per unit time is specified corresponding to the scale specified by the key operation on the keyboard; the clock number specified is frequency-divided for the respective octaves; the clock number per unit time is set up corresponding to the pitch of the key operated; and finally, an output clock signal including these pieces of information is produced. The output clock signal successively address-shifts to read out a waveform signal digitally stored from the memory. The read-out digital signal is converted from digital form to an analogue signal. The analogue signal, i.e. the reproduced musical sound signal, has the frequency corresponding to clock number of the clock signal outputted. Accordingly, the pitch of the sound produced from the speaker 32 corresponds to that of the key depressed. Thus, one properly operates keys on the keyboard thereby to make a corresponding musical performance.

The above-mentioned example relates to the musical sound generation control in the musical instrument; selection of the clock number per unit time corresponding to the key operated; the scale specified, and the octave specified. Although the above-mentioned example relates to the generation control of a signal corresponding to the pitch of a sound source signal, the present invention is applicable for the generation control of an envelope signal for volume control of a musical sound, i.e. for setting up of the attack time, decay time, and release time.

What is claimed is:

1. Apparatus for use in an electronic musical instrument for selecting one of a plurality of tone clock numbers, comprising:
    means for generating reference clock signals;
    binary counting means coupled to said clock signal generating means and including a plurality of stages for binary-counting the reference clock signals from said clock signal generating means;
    a plurality of output lines;
    means for delivering on each of said plurality of output lines a respective output signal representing the logical product of a signal from a respective stage of said binary counting means and an inverted signal from each stage of lower order than said respective stage;
    tone clock number selection means coupled to said output lines for selecting at least one of said output lines to obtain an output clock number corresponding to one of twelve different tone clock frequency signals respectively representing twelve different tones, any two adjacent tone clock frequency signals having a frequency difference of substantially $\sqrt[12]{2}$.

2. The apparatus of claim 1, wherein said tone clock number selection means has twelve output lines which respectively correspond to the twelve highest tones that the musical instrument can provide.

3. The apparatus of claim 2, further comprising frequency dividing means coupled to said tone clock number selection means for producing tone clock frequency signals corresponding to lower tones by selectively frequency dividing said highest tone frequencies outputted from said twelve output lines of said tone clock number selection means.

4. The apparatus of claim 3, further including a memory device for electronically storing tone waveform data; an address counter for sequentially designating said tone waveform data in said memory device in a given order of steps; and means coupling said tone clock frequency signals to said address counter for sequentially reading said tone waveform data out of said memory device responsive to application of said tone clock frequency signals to said address counter.

5. The apparatus of claim 4, further comprising means for providing a logical product of a clock frequency signal from said clock number selection means and a reference clock signal from said reference clock signal generating means.

* * * * *